(12) United States Patent
Woo (10) Patent No.: US 8,295,169 B2
(45) Date of Patent: Oct. 23, 2012

(54) AUTOMATIC SWITCHOVER MECHANISM IN A NETWORK DEVICE (75) Inventor: Hsien-Chung Woo, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 326 days.

(21) Appl. No.: 12/796,170

(22) Filed: Jun. 8, 2010

(65) Prior Publication Data
US 2010/0246392 A1 Sep. 30, 2010

Related U.S. Application Data (63) Continuation of application No. 12/107,145, filed on Apr. 22, 2008, now Pat. No. 7,764,609, which is a continuation of application No. 09/990,077, filed on Nov. 21, 2001, now Pat. No. 7,382,724.

(51) Int. Cl.
H04L 1/00 (2006.01)
H04L 12/26 (2006.01)
H04L 12/28 (2006.01)

(52) U.S. Cl. ........ 370/230; 370/219; 370/220; 370/228; 370/235

(58) Field of Classification Search .......... 370/216–222, 370/225, 228, 230, 235
See application file for complete search history.

(56) References Cited

U.S. PATENT DOCUMENTS

| 4,551,836 | A | 11/1985 | Parikh |
| 5,301,184 | A | 4/1994 | Uriu et al. |
| 5,663,949 | A * | 9/1997 | Ishibashi et al. ............... 370/220 |
| 6,002,687 | A | 12/1999 | Magee et al. |
| 6,031,838 | A | 2/2000 | Okabe et al. |
| 6,262,973 | B1 | 7/2001 | Shiraishi et al. |
| 6,434,532 | B2 | 8/2002 | Goldband et al. |
| 6,496,481 | B1 | 12/2002 | Wu et al. |
| 6,700,868 | B2 | 3/2004 | Smith et al. |
| 6,765,907 | B1 | 7/2004 | Xu et al. |
| 6,778,536 | B1 | 8/2004 | Ofek et al. |
| 6,822,958 | B1 | 11/2004 | Branth et al. |
| 6,865,689 | B1 | 3/2005 | Gibson et al. |
| 6,868,082 | B1 | 3/2005 | Allen, Jr. et al. |
| 6,956,816 | B1 | 10/2005 | Alexander et al. |
| 6,963,926 | B1 | 11/2005 | Robinson |
| 7,065,038 | B1 * | 6/2006 | Brandt et al. ................. 370/219 |
| 7,187,649 | B1 | 3/2007 | Mazzurco et al. |
| 7,197,052 | B1 | 3/2007 | Crocker |
| 7,382,724 | B1 | 6/2008 | Woo |
| 2002/0024928 | A1 | 2/2002 | Furuichi |

FOREIGN PATENT DOCUMENTS
WO   WO 98/59464   12/1998

OTHER PUBLICATIONS

Co-pending U.S. Appl. No. 12/107,145, filed Apr. 22, 2008 entitled "Automatic Switchover Mechanism in a Network Device" by Hsien-Chung Woo, 23 pages.

* cited by examiner

Primary Examiner — Ronald Abelson
(74) Attorney, Agent, or Firm — Harrity & Harrity, LLP (57) ABSTRACT A system comprises a plurality of processing modules, one of which is designated to be the primary processing module and the others are designated to be secondary processing modules. During operation, state is maintained in the primary processing module and at least one of the secondary processing modules. A switchover controller causes outputs from the secondary modules to be discarded. When the switchover controller receives an indication that the primary processing module has failed, it designates one of the secondary processing modules to be the primary processing module. Because the newly designated primary processing module already has current state information at switchover, the module is able to operate with minimal delay.

20 Claims, 6 Drawing Sheets

AUTOMATIC SWITCHOVER MECHANISM IN A NETWORK DEVICE

RELATED APPLICATIONS

This application is a continuation of U.S. patent application Ser. No. 12/107,145 filed Apr. 22, 2008, which is a continuation of U.S. patent application Ser. No. 09/990,077 filed Nov. 21, 2001 (now U.S. Pat. No. 7,382,724), the entire disclosures of which are incorporated herein by reference.

BACKGROUND OF THE INVENTION

In a conventional computer network (e.g., a local area network or wide area network), computers communicate over a network infrastructure made up of interconnected nodes, such as routers and/or switches, connected by communication links such as optical fiber, copper cable, and wireless links. Often, the topology is such that each node connects to multiple neighboring nodes (e.g., as in a mesh configuration).

Typically, data propagates through such a network in discrete units referred herein as "packets" (meaning any fixed- or variable-sized discrete unit of data, including frames, cells, segments, or packets). For each received packet, a node examines the contents of the packet (e.g., a destination address in the packet header) and determines which neighboring node to forward the packet to. Often, a node makes this determination by performing a table lookup. The neighboring node performs a similar determination until the packet eventually propagates from node to node through the network to its destination.

When a node (or a component in the node) fails, the node may no longer be operative to forward packets. Such a failure may result in serious disruption to the performance of the network. Even after the failure is repaired, there may be a delay before the node becomes fully operational, resulting in continued disruption to the network. In routers, for example, the operation of certain components may depend upon state information, which is maintained in the router according to the contents of previously forwarded packets. Accordingly, once the failure in the router is finally repaired, it may take some amount of time for the router to generate sufficient state information for it to function properly.

Thus, there is a need for an invention that more adequately addresses such problems which may occur in the network.

SUMMARY OF THE INVENTION

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

In accordance with the principles of the invention, a system comprises a plurality of processing modules, one of which is designated to be the primary processing module and the others are designated to be secondary processing modules. During operation, state is maintained in the primary processing module and at least one of the secondary processing modules. A switchover controller causes outputs from the secondary modules to be discarded. When the switchover controller receives an indication that the primary processing module has failed, it designates one of the secondary processing modules to be the primary processing module. Because the newly designated primary processing module already has current state information at switchover, the module is able to operate with minimal delay.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one (several) embodiment(s) of the invention and together with the description, serve to explain the principles of the invention.

DESCRIPTION OF THE PREFERRED EMBODIMENTS

According to the invention, a system comprises a plurality of processing modules, one of which is designated to be the primary processing module and the others are designated to be secondary processing modules. During operation, state information is maintained in the primary processing module and at least one of the secondary processing modules. The processing modules may obtain the state information from a received data stream (e.g., information contained in packet headers) or received control information (e.g. routing engine configuration information or control traffic). A switchover controller causes outputs from the secondary modules to be discarded. When the switchover controller receives an indication that the primary processing module has failed, it designates one of the secondary processing modules to be the primary processing module. Because the newly designated primary processing module already has current state information at switchover, the module is able to operate with minimal delay. The invention is described herein in connection with a network switching device, but may be usable in other types of devices that use modules in which state information is maintained.

Figure 1:
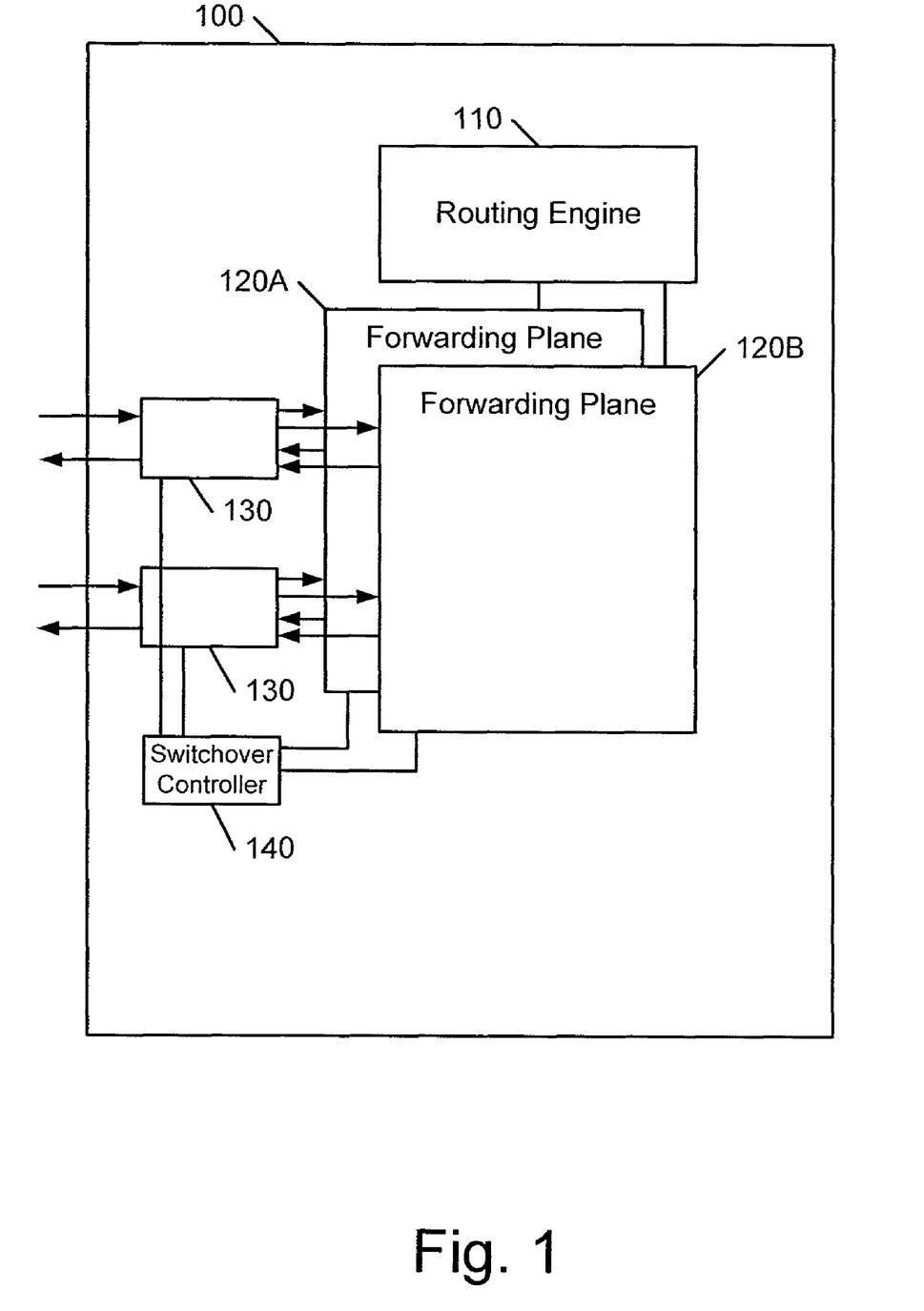
FIG. 1 is a block diagram of a first system incorporating principles of the invention.

FIG. 1 shows system 100 which incorporates principles of the invention. As shown in FIG. 1, system 100 includes routing engine 110, forwarding planes 120A and 120B, interface modules 130, and switchover controller 140. Routing engine 110 is coupled to both forwarding planes 120A and 120B. Each interface module 130 is coupled to both forwarding planes 120A and 120B. Switchover controller 140 is coupled to forwarding planes 120A and 120B and each of the interfaces 130. System 100 is preferably a network switching device (e.g., a router or switch), which interconnects with other switching devices to form part of a network, and accordingly may include other components used in a network switching device.

Routing engine 110 is responsible for generating routing and/or forwarding tables based on information it systematically receives about the network in which system 100 is connected. Such information is typically received using conventional routing protocols. After routing engine 110 generates a forwarding table, it transmits the forwarding to each of the forwarding planes 120A and 120B for use in forwarding packets. In a preferred embodiment, routing engine 110 is implemented as a processor executing software modules.

Forwarding planes 120A and 120B handle packet forwarding. Each forwarding plane includes a plurality of inputs at which data packets are received and a plurality of outputs from which data packets are transmitted. In one embodiment, each forwarding plane is a packet forwarding engine, configured to analyze destination information contained in the headers of received packets and, using a forwarding table, determine appropriate outputs for transmitting the received packets. In another embodiment, each forwarding plane is a TDM (time division multiplexed) plane, configured to analyze destination information contained in received packets and transmit the received packets onto channels at outputs based on appropriate time slots. Forwarding planes 120A and 120B can be implemented in hardware using ASICs or other circuit technology, or in software executing modules to perform the appropriate functionality, or in a combination of hardware and software. The determination of the appropriate outputs for respective packets is preferably carried out using a processor configured to perform table lookups. While two forwarding planes are shown in FIG. 1, more than two forwarding planes could also be used. In accordance with one embodiment of the invention, both forwarding planes receive and process the same packets from interface modules 130 (so that they can both maintain the same state information), though only packets forwarded by the primary forwarding plane are output by interface modules 130.

Interface modules 130 connect to respective external lines and forwarding planes 120A and 120B to transmit packets between the external lines and forwarding planes 120A and 120B. In receiving packets from the external lines, interface modules 130 preferably perform some processing on the received packets (e.g., layer ⅔ header processing) and then transmit the packets to forwarding planes 120A and/or 120B. In transmitting packets out on the external lines, interface modules 130 preferably perform some processing from packets received from forwarding planes 120A and/or 120B and then transmit the packets to the respective lines. In a preferred embodiment, interface modules 130 are equipped to handle characteristics unique to the external lines to which they are connected. For example, if the external lines are fiber optic, interface modules 130 may incorporate optical components, such as lasers, to receive and transmit packets over the fiber optic lines. While two interface modules 130 are shown, fewer or more interface modules 130 may be used. In addition, while each interface module 130 is shown as having a single incoming line and a single outgoing line, interface modules 130 could have more incoming and outgoing lines.

Figure 2A:
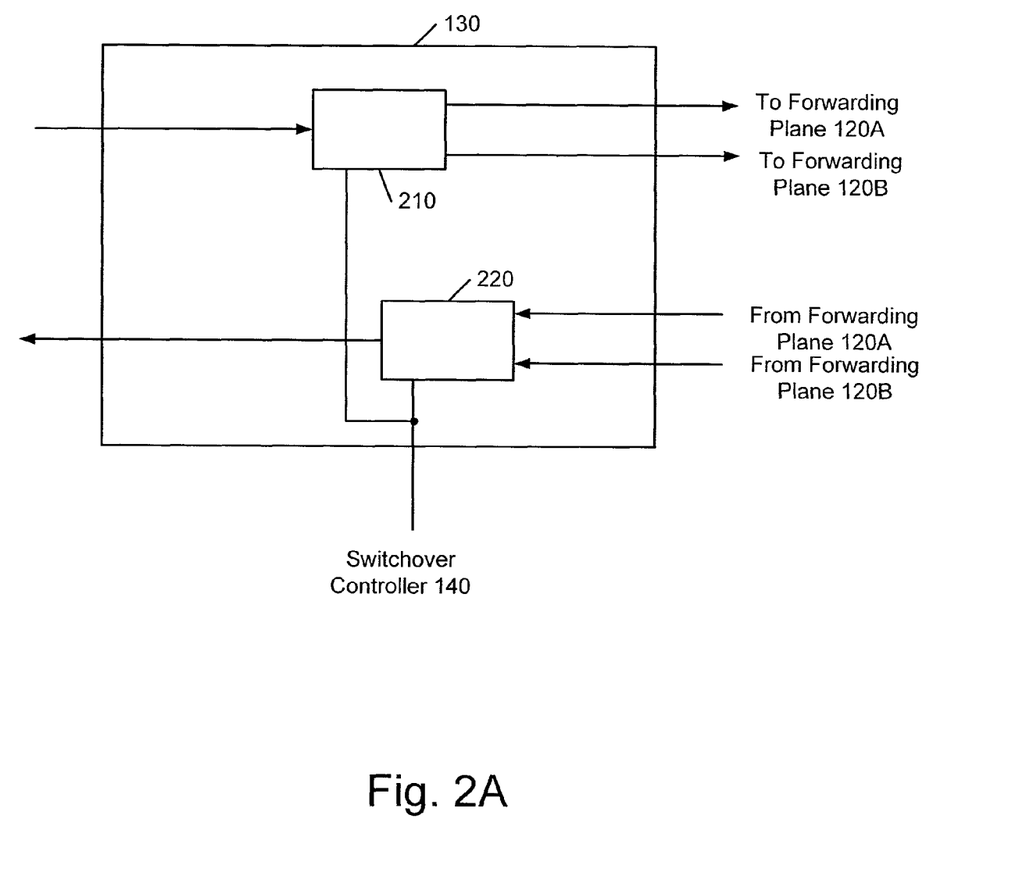
FIGS. 2A and 2B are block diagrams of interface modules usable in the system shown in FIG. 1.

FIGS. 2A and 2B show different embodiments of interface module 130. In FIG. 2A, interface module 130 includes spray logic 210 and despray logic 220. Spray logic 210 receives packets at an incoming line and, under the control of a signal from the switchover controller, outputs the received packets to either forwarding plane 120A or forwarding plane 120B. Despray logic 220 receives packets from both forwarding plane 120A and forwarding plane 120B and, under the control of a signal from the switchover controller, outputs the received packets from one of the forwarding planes to an outgoing line. In one embodiment, spray logic 210 could be implemented as a demultiplexor and despray logic 220 could be implemented as a multiplexor.

Figure 2B:
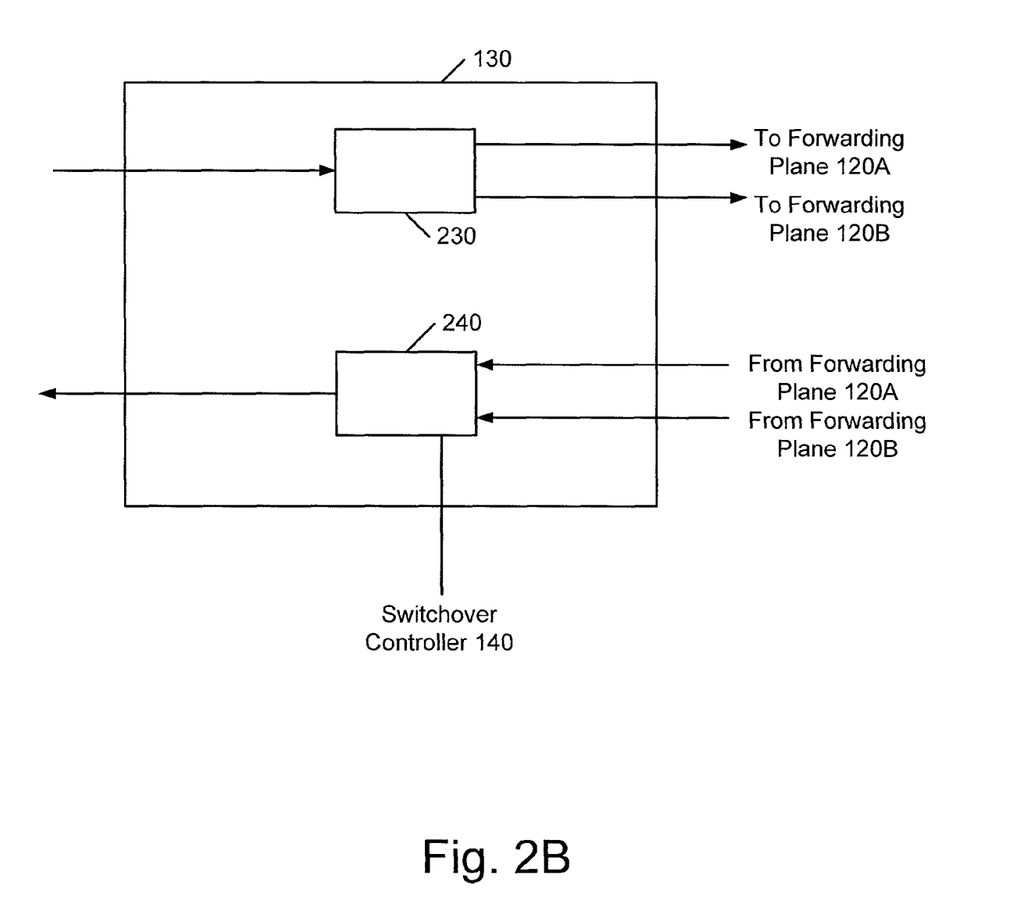

FIG. 2B shows another embodiment of interface module 130. As shown in FIG. 2B, interface module 130 includes duplicator logic 230 and despray logic 240. Duplicator logic 230 differs from spray logic 210 in that duplicator logic 230 duplicates received packets for transmission to both forwarding planes 120A and 120B, while spray logic 210 transmits received packets to only one of the forwarding planes. Because duplicator logic 230 transmits received packets to both forwarding planes, it is shown as not receiving a signal from switchover controller 140. In embodiments where interface module 130 connects to more than two forwarding planes, duplicator logic 230 could receive a signal from switchover controller 140 to transmit received packets to both a primary forwarding plane and a single secondary forwarding plane. Despray logic 240 is substantially similar to despray logic 220.

Referring back to FIG. 1, switchover controller 140 controls the manner in which interface modules 130 interact with forwarding planes 120A and 120B based on the status of the forwarding planes. Switchover controller 140 may be implemented in hardware, software, or a combination of hardware and software.

Figure 3:
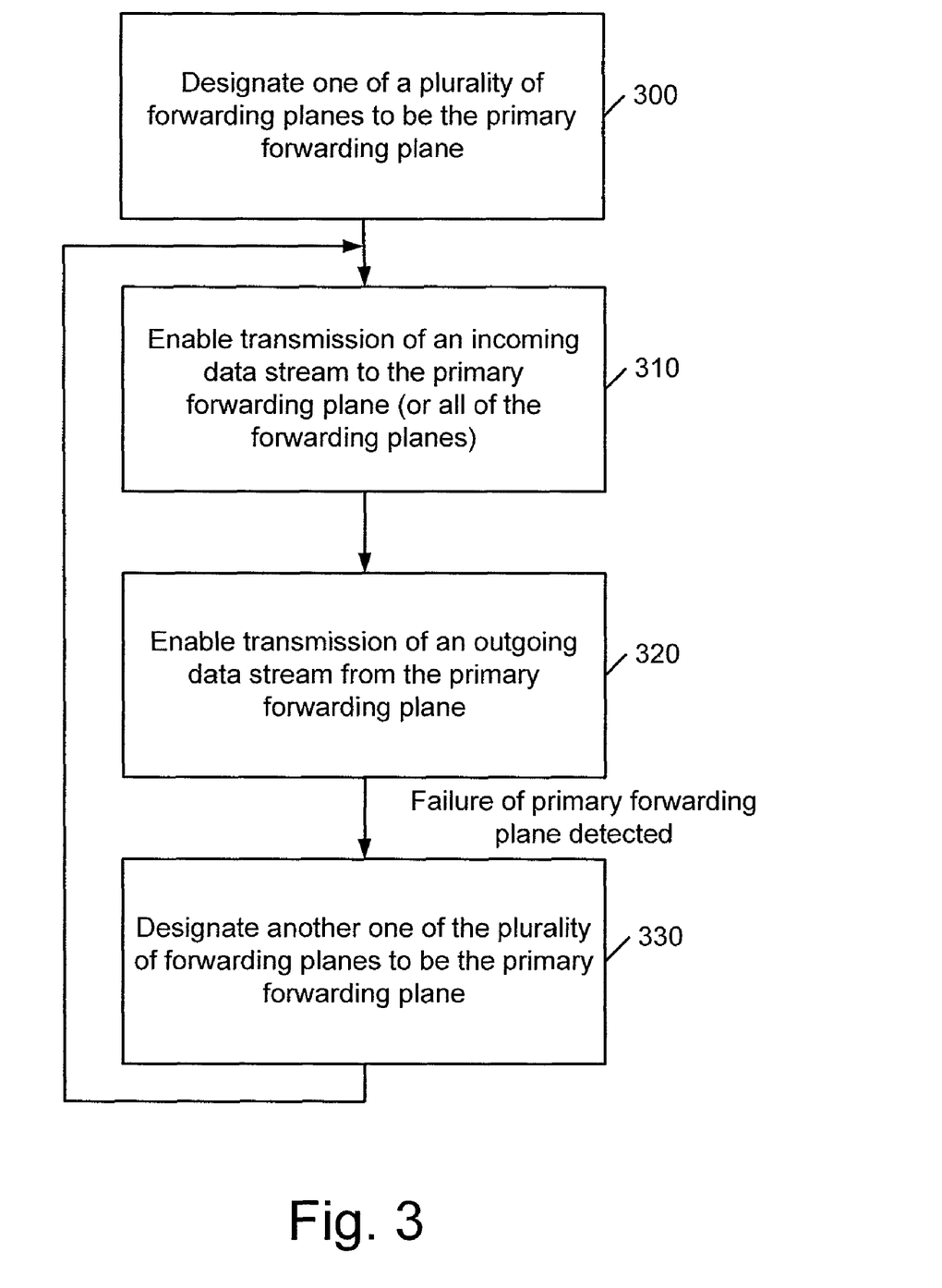
FIG. 3 is a flow chart of a first process incorporating principles of the invention.

The operation of switchover controller 140 is illustrated in the flow chart shown in FIG. 3. Switchover controller 140 designates one of the forwarding planes to be the primary forwarding plane (step 300). This designation may be done by default (e.g., initially always selecting forwarding plane 120A) or after polling the forwarding planes to determine a priority. The forwarding planes that are not designated as the primary forwarding plane may be designated as secondary forwarding planes (as described herein, all non-primary forwarding planes are referred to as secondary forwarding planes, though switchover controller 140 does not have to actually designate those planes as such). When interface module 130 is implemented as shown in FIG. 2A, switchover controller 140 enables transmission of packets received at interface modules 130 to be sent to the designated primary forwarding plane (step 310). When interface module 130 is implemented as shown in FIG. 2B, interface modules 130 send received packets to two or more (or all) of the forwarding planes (step 310). The forwarding plane(s) obtain state information from some or all of the received packets, such as data packets (e.g., packet headers), control packets (e.g., routing engine configuration or control traffic), or both.

Switchover controller 140 enables interface module 130 to transmit an outgoing data stream of packets using packets received from the primary forwarding plane (step 320). By doing so, switchover controller 140 may cause packets received from the secondary forwarding planes to be discarded at interface modules 130. In an alternative embodiment, switchover controller 140 could cause packets from the secondary forwarding planes to be discarded at the secondary forwarding planes before they are received at interface modules 130.

Switchover controller 140 receives signals from one or more of the forwarding planes and determines the status of each forwarding plane. If switchover controller 140 determines that the primary forwarding plane has failed, it designates one of the secondary forwarding planes to be the primary forwarding plane (step 330). In carrying out this step, switchover controller 140 may first check the status of the secondary forwarding plane to ensure that it is operational before designating it to be the primary forwarding plane. Once the primary forwarding plane has been redesignated, switchover controller 140 performs steps 310 and 320 until the newly designated primary forwarding plane fails.

Figure 4:
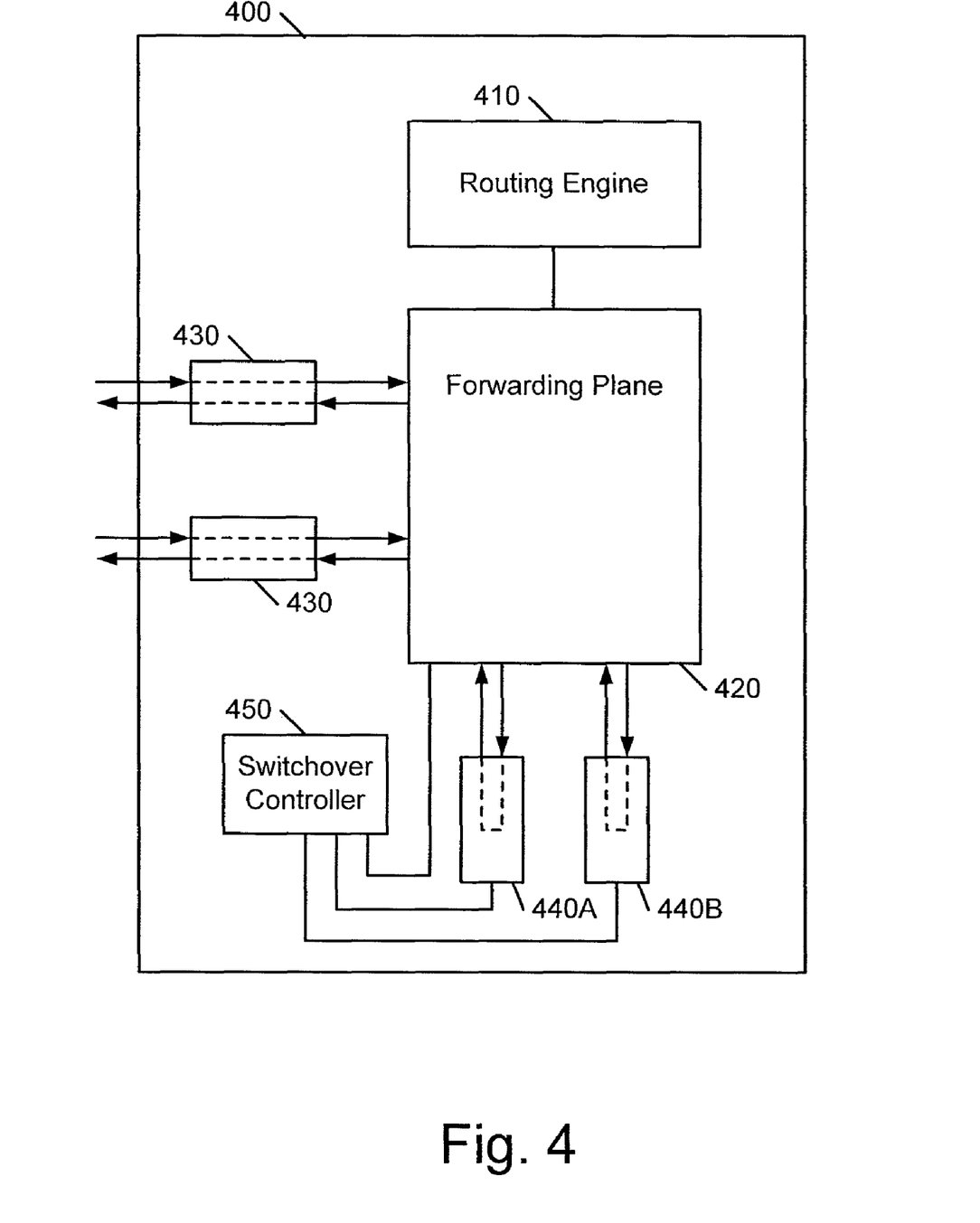
FIG. 4 is a block diagram of a second system incorporating principles of the invention.

While FIGS. 1-3 depict one system that incorporates principles of the invention, other systems can also be configured. FIG. 4 shows another such system, system 400, which incorporates principles of the invention. System 400 includes routing engine 410, forwarding plane 420, interface modules 430, service modules 440A and 440B, and switchover controller 450. Forwarding plane 420 is coupled to routing engine 410, interface modules 430, service modules 440A and 440B, and switchover controller 450. Switchover controller is also coupled to service modules 440A and 440B. Like system 100, system 400 is preferably a network switching device (e.g., a router or switch), which interconnects with other switching devices to form part of a network, and accordingly may include other components used in a network switching device.

Routing engine 410 and forwarding plane 420 are similar to routing engine 110 and one of the forwarding planes 120A and 120B, respectively. Forwarding plane 420 is also configured to duplicate designated packets and transmit them to two or more outputs (or two or more modules coupled to forwarding plane 420). Forwarding plane 420 may, for example, include multicast functionality that permits it to transmit designated packets to multiple destinations. In a preferred embodiment, forwarding plane 420 can transmit certain packets destined for a service module to both service modules 440A and 440B.

Interface modules 430 serve as an external interface for system 400. Interface modules 430 connect to respective external lines and forwarding plane 420 to transmit packets between the external lines and forwarding plane 420. In receiving packets, interface modules 430 preferably perform some processing on the received packets (e.g., layer ⅔ header processing) and then transmit the packets to forwarding plane 420. In transmitting packets, interface modules 430 preferably perform some processing from packets received from forwarding plane 420 and then transmit the packets to the respective lines. In a preferred embodiment, interface modules 430 are equipped to handle characteristics unique to the external lines to which they are connected. For example, if the external lines are fiber optic, interface modules 430 may incorporate optical components, such as lasers, to receive and transmit packets over the fiber optic lines. While two interface modules 430 are shown, fewer or more interface modules 430 may be used. In addition, while each interface module 430 is shown as having a single incoming line and a single outgoing line, interface modules 430 could have more incoming and outgoing lines.

Service modules 440A and 440B are processing modules that connect to forwarding plane 420. Each service module receives packets from forwarding plane 420, processes the received packets in some manner (such as by performing packet encapsulation), and outputs the processed packets back to forwarding plane 420. From the perspective of forwarding plane 420, service modules 440A and 440B may be treated like interface modules 430. Forwarding plane 420 transmits flows of packets to the service modules and receives flows of packets from the service modules. In accordance with the invention, both service modules receive and process the same packets from forwarding plane 420 (so that they can maintain the same state information), though processed packets from only the primary service module are forwarded by forwarding plane 420.

Switchover controller 450 controls the manner in which service modules 440A and 44B interact with forwarding plane 420 based on the status of the service modules. Switchover controller 450 may be implemented in hardware, software, or a combination of hardware and software. The operation of switchover controller 450 is illustrated in the flow chart shown in FIG. 5.

Figure 5:
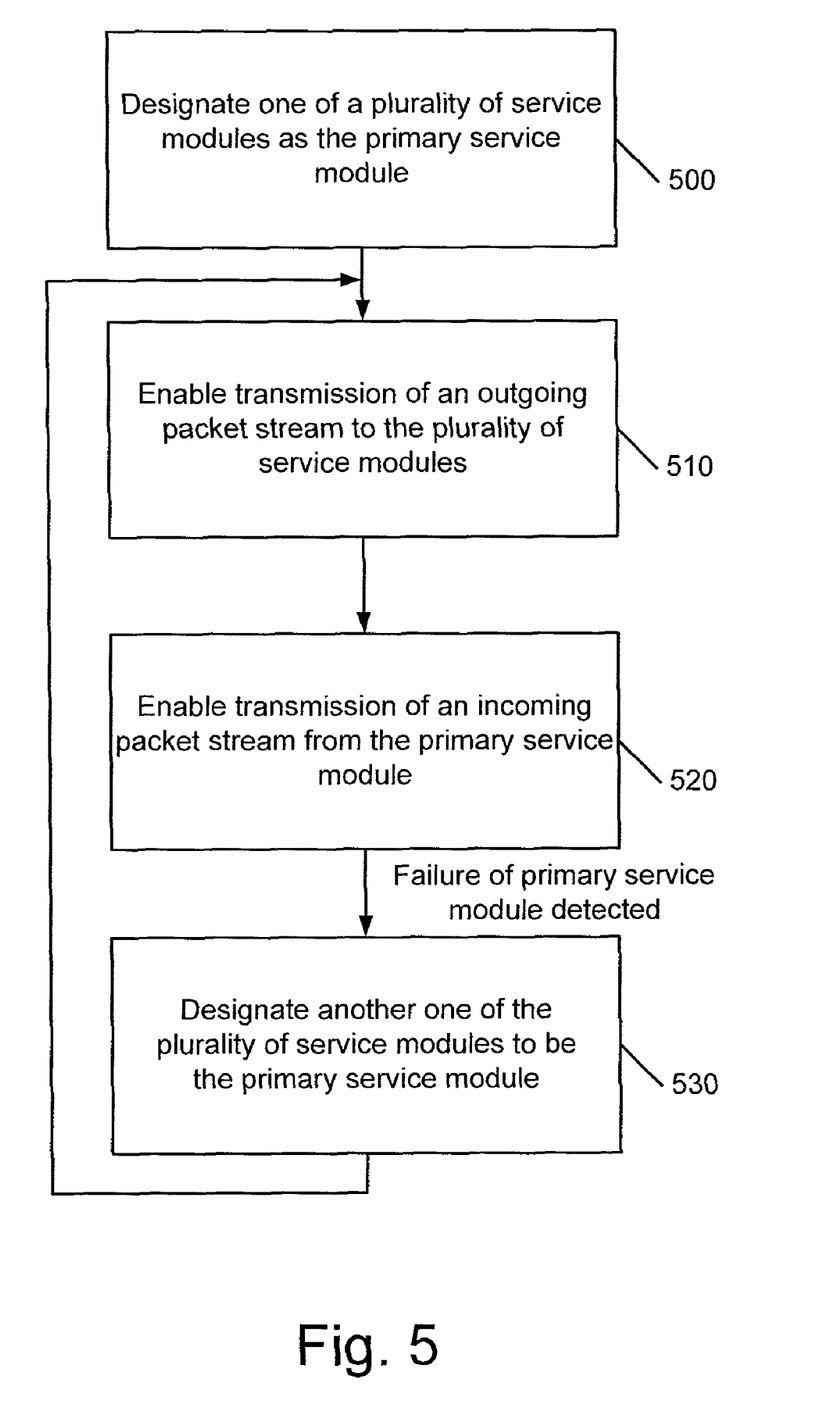
FIG. 5 is a flow chart of a second process incorporating principles of the invention.

Switchover controller 450 designates one of the service modules 440A and 440B to be the primary service module (step 500). This designation may be done by default (e.g., initially always selecting service module 440A) or after polling the service modules to determine a priority. The service modules that are not designated as the primary forwarding plane may be designated as secondary service modules (as described herein, all non-primary service modules are referred to as secondary service modules, though switchover controller 140 does not have to designate those modules as such). Switchover controller 450 enables transmission of packets from forwarding plane 420 to be sent to both of the service modules (step 510). Forwarding plane 420 may employ a multicast mechanism so that the same packets are sent to both service modules. In an alternative embodiment, forwarding plane 420 is configured (by switchover controller 450 or in some other manner, such as manually by a user) to send duplicate packets to both service modules. The service modules obtain state information from some or all of the received packets, such as data packets (e.g., packet headers), control packets (e.g., routing engine configuration or control traffic), or both.

Switchover controller 450 enables packets from the primary service module to be received by forwarding plane 420 for forwarding (step 520). By doing so, switchover controller 450 may cause packets received from the secondary service module to be discarded at the secondary service module or at forwarding plane 420.

Switchover controller 450 receives signals from one or more of the service modules and determines the status of each service module. If switchover controller 450 determines that the primary service module has failed, it designates one of the secondary service modules to be the primary service module (step 530). In carrying out this step, switchover controller 450 may first check the status of the secondary service module to ensure that it is operational before designating it to be the primary service module. Once the primary service module has been redesignated, switchover controller 450 performs steps 510 and 520 until the newly designated primary service module fails.

Other embodiments of the invention will be apparent to those skilled in the art from consideration of the specification and practice of the invention disclosed herein. The invention, for example, may be utilized in any digital system incorporating redundant components whose operation is based on maintained state information. State is maintained in both the primary and secondary components, so that operation can be switched over from the primary to the secondary components without waiting the entire period the secondary component would need to obtain state before it became operational. In the context of a network device, another example of such a component could be a routing engine. Moreover, while state information may be communicated to the primary and secondary components over data traffic, control traffic, or both, state information may also be communicated in other forms and manners. It is intended that the specification and examples be considered as exemplary only, with a true scope and spirit of the invention being indicated by the following claims.

What is claimed is:

1. A method comprising:
   designating, by a controller of a network device, one of a plurality of forwarding planes as a primary forwarding plane and another one of the plurality of forwarding planes as a secondary forwarding plane;
   receiving, by an interface module, incoming data from a network;
   enabling, by the controller, transmission of the incoming data from the interface module to at least the primary forwarding plane and the secondary forwarding plane of the plurality of forwarding planes;
independently maintaining, by at least the primary forwarding plane and the secondary forwarding plane of the plurality of forwarding planes, current state information associated with the network;
transmitting, by at least the primary forwarding plane and the secondary forwarding plane of the plurality of forwarding planes, outgoing data to the interface module;
discarding, by the interface module or the secondary forwarding plane, the outgoing data from the secondary forwarding plane; and
transmitting, by the interface module, the outgoing data from the primary forwarding plane of the plurality of forwarding planes through the network.

2. The method of claim 1, further comprising:
obtaining, by a routing engine, control information associated with the network;
generating, by the routing engine, a table for determining a destination for forwarding the outgoing data through the network; and
transmitting, by the routing engine, the table to at least the primary forwarding plane and the secondary forwarding plane of the plurality of forwarding planes to allow at least the primary forwarding plane and the second forwarding plane of the plurality of forwarding planes to maintain the current state information associated with the network.

3. The method of 2, where the plurality of forwarding planes includes more than two forwarding planes;
where the transmitting the table to at least the primary forwarding plane and the secondary forwarding plane of the plurality of forwarding planes, further comprises:
transmitting the table to each of the plurality of forwarding planes, and
where the independently maintaining, by at least the primary forwarding plane and the secondary forwarding plane of the plurality of forwarding planes, the current state information associated with the network, further comprises:
independently maintaining, by each of the plurality of forwarding planes, the current state information associated with the network.

4. The method of claim 1, further comprising:
determining, by the controller, a status of at least two of the plurality of forwarding planes; and
where the designating is based on the determined status of the at least two of the plurality of forwarding planes.

5. The method of claim 1, where the plurality of forwarding planes includes more than two forwarding planes, and the method further comprises:
determining, by the controller, a status of each of the plurality of forwarding planes; and
where the designating is based on the determined status of each of the plurality of forwarding planes.

6. The method of claim 1, further comprising:
determining, by the controller, a failure of the primary forwarding plane; and
designating, by the controller, the secondary forwarding plane as the primary forwarding plane.

7. The method of claim 6, further comprising:
designating, by the controller, another one of the plurality of forwarding planes as the secondary forwarding plane.

8. A system comprising:
an interface module to:
receive an incoming packet from a network,
transmit the incoming packet to a forwarding plane; and
the forwarding plane to:
receive the incoming packet from the interface module,
duplicate the incoming packet to form a first packet and a duplicate packet,
transmit the first packet to a first service module, the first service module to process the first packet to obtain state information associated with the network,
transmit the duplicate packet to a second service module, the second service module to process the duplicate packet to obtain duplicate state information associated with the network;
receive the first packet from the first service module and the duplicate packet from the second service module,
transmit, when the first service module is designated as a primary service module, the first packet to the interface module and discard the duplicate packet, and
transmit, when the second service module is designated as the primary service module by the switchover controller, the duplicate data packet to the interface module and discard the first data packet.

9. The system of claim 8, further comprising:
a controller to:
determine a status of the first service module, and
designate, based on the determined status of the first service module, the first service module or the second service module as the primary service module.

10. The system of claim 9, where the controller is further to:
determine a failure of the first service module, and
designate the second service module as the primary service module.

11. The system of claim 10, where the controller is further to:
determine the first service module as operational, and
designate the first service module as the primary service module.

12. The system of claim 8, further comprising:
a controller to:
determine a status of the first service module,
determine a status of the second service module, and
designate, based on the determined status of the first service module and the determined status of the second service module, the first service module or the second service module as the primary service module.

13. The system of claim 8, further comprising:
a plurality of other forwarding planes, each of the plurality of other forwarding planes to:
receive a received packet from an interface module,
duplicate the received packet to form a first packet and a duplicate packet,
transmit the first packet to the first service module, the first service module to process the first packet to obtain the state information associated with the network,
transmit the duplicate packet to the second service module, the second service module to process the duplicate packet to obtain the duplicate state information associated with the network;
receive the first packet from the first service module and the duplicate packet from the second service module,
transmit, when the first service module is designated as the primary service module, the first packet to the interface module and discard the duplicate packet, and
transmit, when the second service module is designated as the primary service module, the duplicate packet to the interface module and discard the first packet.

14. The system of claim 13, further comprising:
a controller to:
  determine a status of the first service module, and
  designate, based on the determined status of the first service module, the first service module or the second service module as the primary service module.

15. A network device comprising:
a routing engine to:
  obtain control information associated with a network associated with the network device,
  generate a routing table based on the obtained control information,
  transmit the routing table to a first forwarding plane and a second forwarding plane to allow the first forwarding plane and the second forwarding plane to independently maintain state information associated with the network associated with the network device;
a controller to:
  designate the first forwarding plane or the second forwarding plane as a primary forwarding plane,
  enable an interface module to transmit an incoming packet received from the network to the designated primary forwarding plane and to transmit an outgoing packet received from the designated primary forwarding plane to the network.

16. The network device of claim 15, where the controller is further to:
  determine a status of the first forwarding plane, and
  designate, based on the determined status of the first forwarding plane, the first forwarding plane or the second forwarding plane as a primary forwarding plane.

17. The network device of claim 15, where the controller is further to:
  determine a status of the first forwarding plane,
  determine a status of the second forwarding plane, and
  designate, based on the determined status of the first forwarding plane and the determined status of the second forwarding plane, the first forwarding plane or the second forwarding plane as a primary forwarding plane.

18. The network device of claim 15, where the first forwarding plane is designated as the primary forwarding plane, and where the controller is further to:
  determine a failure of the first forwarding plane, and
  designate, in response to determining the failure of the first forwarding plane, the second forwarding plane as the primary forwarding plane.

19. The network device of claim 15, further comprising:
a plurality of forwarding planes, the plurality of forwarding planes including the first forwarding plane, the second forwarding plane, and at least a third forwarding plane;
and where the routing engine is further to:
  transmit the routing table to the plurality of forwarding planes to allow each of the plurality of forwarding planes to independently maintain the state information associated with the network.

20. The network device of claim 19, where the controller is further to:
  designate one of the plurality of forwarding planes as the primary forwarding plane, and
  designate a plurality of secondary forwarding planes.

* * * * *